United States Patent
Han

(10) Patent No.: US 10,417,826 B2
(45) Date of Patent: Sep. 17, 2019

(54) INFORMATION INPUT METHOD IN 3D IMMERSIVE ENVIRONMENT

(71) Applicant: Beijing Pico Technology Co., Ltd., HaiDian District, Beijing (CN)

(72) Inventor: Jin Han, Beijing (CN)

(73) Assignee: BEIJING PICO TECHNOLOGY CO., LTD., Haidian District, Beijing (CN)

( * ) Notice: Subject to any disclaimer, the term of this patent is extended or adjusted under 35 U.S.C. 154(b) by 0 days.

(21) Appl. No.: 15/292,988

(22) Filed: Oct. 13, 2016

(65) Prior Publication Data
US 2017/0301138 A1 Oct. 19, 2017

(30) Foreign Application Priority Data
Apr. 15, 2016 (CN) .......................... 2016 1 0237717

(51) Int. Cl.
| | |
|---|---|
| *G06T 19/00* | (2011.01) |
| *G06F 3/0346* | (2013.01) |
| *G06F 3/041* | (2006.01) |
| *G06F 3/0488* | (2013.01) |
| *G06F 3/01* | (2006.01) |
| *G06F 3/0484* | (2013.01) |

(Continued)

(52) U.S. Cl.
CPC ............ *G06T 19/006* (2013.01); *G06F 1/163* (2013.01); *G06F 3/011* (2013.01); *G06F 3/0346* (2013.01); *G06F 3/041* (2013.01); *G06F 3/04842* (2013.01); *G06F 3/04886* (2013.01); *G06F 3/04892* (2013.01)

(58) Field of Classification Search
CPC .................................................. G06T 19/006
See application file for complete search history.

(56) References Cited

U.S. PATENT DOCUMENTS

| | | | | |
|---|---|---|---|---|
| 6,098,086 A | * | 8/2000 | Krueger ................. | G06F 3/018 707/999.101 |
| 2011/0201387 A1 | * | 8/2011 | Paek ..................... | G06F 3/0237 455/566 |

(Continued)

FOREIGN PATENT DOCUMENTS

CN 104076512 A 10/2014

*Primary Examiner* — Grace Q Li
(74) *Attorney, Agent, or Firm* — Arent Fox LLP

(57) ABSTRACT

The present disclosure discloses an information input method in a 3D immersive environment, comprising: displaying a virtual keyboard in the 3D immersive environment; selecting a key position on the virtual keyboard and determining the selected key position; and sending a confirmation instruction to the selected key position, and inputting information corresponding to the selected key position into an information input box to thereby complete information input for one time. Displaying the virtual keyboard to the user in the 3D immersive environment and receiving the user's selection and confirmation instruction of the key position on the virtual keyboard solves the problem that the user, wearing the virtual reality headset device, cannot see actual key positions of a keyboard in reality and cannot input information and enables the user to conveniently and quickly input information by typewriting in the virtual environment.

9 Claims, 3 Drawing Sheets

(51) Int. Cl.
*G06F 3/0489* (2013.01)
*G06F 1/16* (2006.01)

(56) References Cited

U.S. PATENT DOCUMENTS

| | | | |
|---|---|---|---|
| 2011/0221656 A1* | 9/2011 | Haddick | G02B 27/017 345/8 |
| 2014/0218294 A1* | 8/2014 | Wang | G06F 3/0219 345/160 |
| 2015/0293644 A1* | 10/2015 | Watanabe | G06F 3/0426 345/168 |
| 2016/0124926 A1* | 5/2016 | Fallah | G06F 3/0486 715/271 |
| 2017/0076502 A1* | 3/2017 | Chen | G06T 19/006 |
| 2017/0212596 A1* | 7/2017 | Jin | G06F 3/017 |

\* cited by examiner

INFORMATION INPUT METHOD IN 3D IMMERSIVE ENVIRONMENT

CROSS-REFERENCE TO RELATED APPLICATION

This application claims the benefit and priority of Chinese Patent Application No. 201610237717.7 filed Apr. 15, 2016. The entire disclosure of the above application is incorporated herein by reference.

FIELD OF THE DISCLOSURE

The present disclosure relates to the technical field of virtual reality, and particularly to an information input method in a 3D immersive environment.

BACKGROUND OF THE DISCLOSURE

In a 3D immersive environment, after a user wears a headset device, he cannot see actual key positions of a keyboard in reality and cannot input information in an input manner universally used on a 2D device currently, which cannot satisfy the user's demands for information input and social intercourse and the like in the immersive environment.

SUMMARY OF THE DISCLOSURE

To solve the problem that the user, wearing a virtual reality headset device, cannot see actual key positions of a keyboard in reality and cannot input information and to enable the user to conveniently and quickly input by typewriting in the virtual environment, the present disclosure provides an information input method in a 3D immersive environment, comprising:

displaying a virtual keyboard in the 3D immersive environment;

selecting a key position on the virtual keyboard and determining the selected key position; and sending a confirmation instruction to the selected key position, and inputting information corresponding to the selected key position into an information input box to thereby complete information input for one time.

Preferably, a system where the 3D immersive environment lies comprises a handle;

the selecting a key position on the virtual keyboard and determining the selected key position specifically comprises:

setting a certain key position of the virtual keyboard as an initial selected key position; and sending a key position selection instruction via up, down, left or right direction key of the handle, and taking a key position adjacent to the currently-selected key position in a corresponding direction as a new selected key position.

Preferably, a system where the 3D immersive environment lies comprises a handle having a gyroscope function;

the selecting a key position on the virtual keyboard and determining the selected key position specifically comprises:

displaying a virtual cursor in the immersive environment; collecting spatial movement information of the handle via the gyroscope of the handle, and controlling movement of the virtual cursor in the immersive environment;

moving the handle to control the virtual cursor to move into a area of the virtual keyboard, and changing the virtual cursor into a selection box for selecting a key position; and moving the handle to control the selection box to move to a certain key position of the virtual keyboard, and taking the key position where the selection box lies as the selected key position.

Preferably, the sending a confirmation instruction to the selected key position, and inputting information corresponding to the selected key position into an information input box specifically comprises:

binding the confirmation instruction to a certain key on the handle; when the key is pressed, sending the confirmation instruction to the selected key position, and inputting information corresponding to the current selected key position into the information input box.

Preferably, a system where the 3D immersive environment lies comprises a handle on which a touch panel is disposed; or, a touch panel is disposed on a headset device of a system where the 3D immersive environment lies;

the selecting a key position on the virtual keyboard and determining the selected key position specifically comprises:

displaying a virtual cursor in the immersive environment; sliding a finger up, down, to the left or to the right on a surface of the touch panel, controlling the virtual cursor to move into the area of the virtual keyboard, and changing the virtual cursor into a selection box for selecting a key position; and sliding a finger up, down, to the left or to the right on a surface of the touch panel to control the selection box to move to a certain key position of the virtual keyboard, and taking the key position where the selection box lies as the selected key position.

Preferably, the sending a confirmation instruction to the selected key position, and inputting information corresponding to the selected key position into an information input box specifically comprises:

binding the confirmation instruction to a certain key on the handle; when the key is pressed, sending the confirmation instruction to the selected key position, and inputting information corresponding to the current selected key position into the information input box;

or, by clicking the touch panel one time, sending the confirmation instruction to the selected key position, and inputting information corresponding to the current selected key position into the information input box.

Preferably, the selecting a key position on the virtual keyboard and determining the selected key position specifically comprises:

locking the virtual keyboard in the immersive environment so that the virtual keyboard does not change the position along with the user's head motion;

displaying the virtual cursor straight ahead the user's sight line in the immersive environment so that the virtual cursor moves along with the user's head motion; and controlling the virtual cursor to a certain key position of the virtual keyboard through the head motion and taking the key position where the virtual cursor lies as the selected key position.

Preferably, the sending a confirmation instruction to the selected key position, and inputting information corresponding to the selected key position into an information input box specifically comprises:

when a time period for which the virtual cursor stays on the selected key position reaches a preset value, sending the confirmation instruction to the selected key position, and inputting information corresponding to the selected key position into the information input box;

or, a system where the 3D immersive environment lies comprises a handle, binding the confirmation instruction to a certain key on the handle; when the key is pressed, inputting information corresponding to the current selected key position into the information input box.

Advantageous effects of embodiments of the present disclosure are as follows: displaying the virtual keyboard to the user in the 3D immersive environment and receiving the user's selection and confirmation instruction of the key position on the virtual keyboard solves the problem that the user, wearing the virtual reality headset device, cannot see actual key positions of a keyboard in reality and cannot input information and enables the user to conveniently and quickly input information by typewriting in the virtual environment. In further preferred embodiments are provided many manners of controlling input, e.g., operating a key on the handle, moving the handle, sliding on the touch panel, or moving head, or the like. These manners may be implemented simultaneously in the same virtual reality system so that the user selects a suitable input manner according to his own needs and different users' demands are satisfied.

DETAILED DESCRIPTION OF PREFERRED EMBODIMENTS

Embodiments of the present disclosure will be described below in further detail in conjunction with figures to make the objectives, technical solutions and advantages of the present disclosure clearer.

Figure 1:
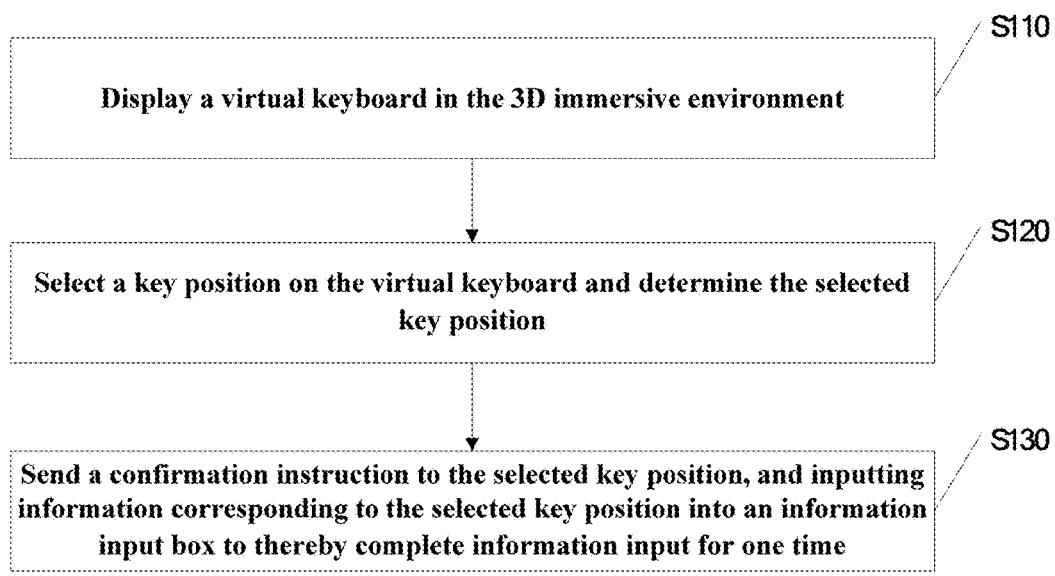
FIG. 1 is a flow chart of an information input method in a 3D immersive environment according to an embodiment of the present disclosure.

FIG. 1 is a flow chart of an information input method in a 3D immersive environment according to an embodiment of the present disclosure. As shown in FIG. 1, the information input method in a 3D immersive environment according to an embodiment of the present disclosure comprises:

Step S110: displaying a virtual keyboard in the 3D immersive environment.

After a user wears a headset device, he cannot see actual key positions of a keyboard in reality and therefore cannot use the keyboard in reality to input information by typewriting, so the embodiment of the present disclosure provides a virtual keyboard to the user in the 3D immersive environment to enable the user to input information by using the virtual keyboard.

Step S120: selecting a key position on the virtual keyboard and determining the selected key position.

Various key positions are arranged on the virtual keyboard by a certain rule and include various character keys and function keys. Upon inputting information, the user first selects a desired key position in the virtual keyboard; for example, if the user needs to input the letter m, he needs to select the key position representing the letter m in the virtual keyboard.

Step S130: sending a confirmation instruction to the selected key position, and inputting information corresponding to the selected key position into an information input box to thereby complete information input for one time.

After the desired key position is selected, a confirmation instruction is sent to the selected key position to indicate that the user confirms inputting information corresponding to the currently-selected key position. For example, after the letter m is selected on the virtual keyboard, the confirmation instruction is sent to input the letter m into the information input box; if the confirmation instruction is not sent, even if a certain key position is already selected, the corresponding information will not be input into the input box.

Displaying the virtual keyboard to the user in the 3D immersive environment and receiving the user's selection and confirmation instruction of the key position on the virtual keyboard solves the problem that the user, wearing the virtual reality headset device, cannot see actual key positions of a keyboard in reality and cannot input information and enables the user to conveniently and quickly input information by typewriting in the virtual environment.

Figure 2:
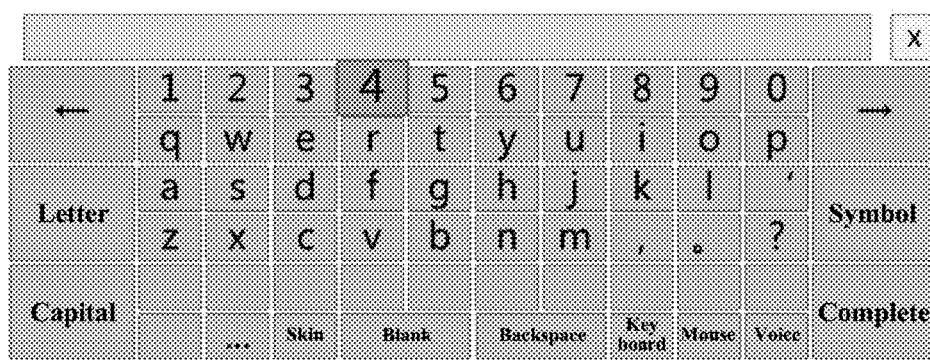
FIG. 2 is a schematic view of controlling input through keys on a handle in an information input method in a 3D immersive environment according to an embodiment of the present disclosure.

FIG. 2 is a schematic view of controlling input through keys on a handle in an information input method in a 3D immersive environment according to an embodiment of the present disclosure. As shown in FIG. 2, in a preferred embodiment of the present disclosure, a system where the 3D immersive environment lies comprises a handle, the "selecting a key position on the virtual keyboard and determining the selected key position" in step S120 specifically comprises: setting a certain key position of the virtual keyboard as an initial selected key position; and sending a key position selection instruction via up, down, left or right direction key of the handle, and taking a key position adjacent to the currently-selected key position in a corresponding direction as a new selected key position.

Figure 4:
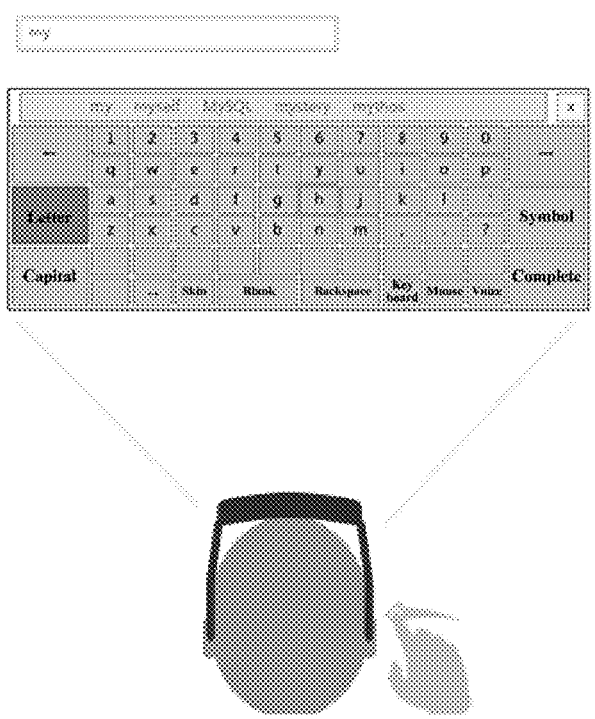
FIG. 4 is a schematic view of controlling input by sliding on a touch panel in an information input method in a 3D immersive environment according to an embodiment of the present disclosure.

In the present embodiment, the key position is controlled and selected by operating keys of the handle, the handle is connected in the system where the 3D immersive environment lies in a wired or wireless manner, for example, a virtual reality device, and the handle is connected to the device via Bluetooth. First, when the user needs to input information in the 3D immersive environment, a virtual keyboard pops up to the user, and a default selected key position is set on the keyboard, e.g., a key position of letter g in the middle of the keyboard. The selected key position may display a certain effect to highlight so that the user may visually see which key position is the currently-selected key position. For example, digit key 4 in FIG. 4 is highlighted, and this indicates that the current user selects the digit key 4. When the up, down, left or right direction key of the handle is pressed, the selected key position moves accordingly. For example, when the right direction key on the handle is pressed at this time, the digit key 5 is selected and highlighted.

Further preferably, the "sending a confirmation instruction to the selected key position, and inputting information corresponding to the selected key position into an information input box" in step S130 specifically comprises: binding the confirmation instruction to a certain key on the handle; when the key is pressed, sending the confirmation instruction to the selected key position, and inputting information corresponding to the current selected key position into the information input box. For example, the key X on the handle may be set as a confirmation key, and when the user presses the key X on the handle, information corresponding to the currently-selected key, for example, digit 4 in FIG. 1, is input into the information input box.

In the information input method in a 3D immersive environment according to the preferred embodiment, input of character, letter, digit, symbol and the like on the virtual keyboard in the immersive environment may be implemented only by connecting the handle into the system where the 3D immersive environment lies, and furthermore, that is adapted for various handles available in the market so that the user may conveniently and quickly complete input.

Figure 3:
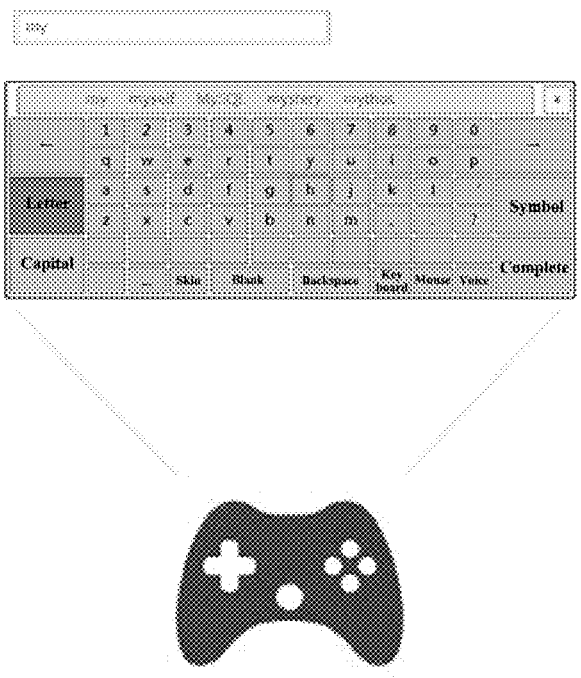
FIG. 3 is a schematic view of controlling input by moving the handle in an information input method in a 3D immersive environment according to an embodiment of the present disclosure.

FIG. 3 is a schematic view of controlling input by moving the handle in an information input method in a 3D immersive environment according to an embodiment of the present disclosure. As shown in FIG. 3, in another preferred embodiment of the present disclosure, the system where the immersive environment lies comprises a handle having a gyroscope function, and a gyroscope sensor of the handle is used to collect handle movement information to simulate movement of a virtual cursor in the immersive environment. The "selecting a key position on the virtual keyboard and determining the selected key position" in step S120 specifically comprises:

displaying a virtual cursor in the immersive environment, the virtual cursor corresponding to a mouse pointer of a desktop of a PC and used to select an object in the immersive environment.

The gyroscope of the handle is used to collect spatial movement information of the handle, and movement of the virtual cursor in the immersive environment is controlled. At this time, the handle in the user's hand corresponds to the virtual cursor in the immersive environment, the user may hold the handle to move randomly in the reality space, and the virtual cursor in the immersive environment also move correspondingly at the same time.

The handle is moved to control the virtual cursor to move into the area of the virtual keyboard, the virtual cursor becomes a selection box for selecting a key position, the handle is moved to control the selection box to move to a certain key position of the virtual keyboard, and the key position where the selection box lies is taken as the selected key position. Usually, the virtual cursor is a cross-shaped cursor, and when the cross-shaped cursor is moved into the area of the virtual keyboard, the cross-shaped cursor becomes a selection box, wherein the handle corresponds to the selection box. When the handle moves, the selection box moves accordingly and may select a desired key position. As shown in FIG. 2, a frame will appear around the key position for highlight purpose so that the user will visually understand which key position is selected.

Further preferably, the "sending a confirmation instruction to the selected key position, and inputting information corresponding to the selected key position into an information input box" in step S130 specifically comprises: binding the confirmation instruction to a certain key on the handle; when the key is pressed, sending the confirmation instruction to the selected key position, and inputting information corresponding to the current selected key position into the information input box. This may apply to various handles available in the market.

In the present preferred embodiment, with the handle being moved in the real space, movement of the virtual cursor in the immersive environment is controlled to select the key position in the virtual keyboard and achieve information input in the immersive environment. Furthermore, the virtual cursor moves along with the user's hand motion, immersive feeling is enhanced and a better user experience is provided.

FIG. 4 is a schematic view of controlling input by sliding on a touch panel in an information input method in a 3D immersive environment according to an embodiment of the present disclosure. As shown in FIG. 4, in a further preferred embodiment of the present disclosure, the system where the 3D immersive environment lies comprises a handle on which a touch panel is disposed; or a touch panel is disposed on a headset device of the system where the 3D immersive environment lies. The "selecting a key position on the virtual keyboard and determining the selected key position" in step S120 specifically comprises: displaying a virtual cursor in the immersive environment; sliding a finger up, down, to the left or to the right on a surface of the touch panel, controlling the virtual cursor to move into the area of the virtual keyboard, and changing the virtual cursor into a selection box for selecting a key position; and sliding a finger up, down, to the left or to the right on a surface of the touch panel to control the selection box to move to a certain key position of the virtual keyboard, and taking the key position where the selection box lies as the selected key position. The finger slides on the surface of the touch panel to control the movement of the virtual cursor in the immersive environment, the virtual cursor, after moving into the area of the virtual keyboard, changes from the cross-shaped cursor to a selection box, and the finger continues to slide on the surface of the touch panel to control the selection box to move. It is feasible to set the selection box to move according to the finger's trajectory, or set the selection box to move one position to the right as the user's finger slides one time from the left to right, for example, the selection box moves from the letter g to the letter h as shown in FIG. 4.

Further preferably, the "sending a confirmation instruction to the selected key position, and inputting information corresponding to the selected key position into an information input box" in step S130 specifically comprises: binding the confirmation instruction to a certain key on the handle; when the key is pressed, sending the confirmation instruction to the selected key position, and inputting information corresponding to the current selected key position into the information input box; or, by clicking the touch panel one time, sending the confirmation instruction to the selected key position, and inputting information corresponding to the current selected key position into the information input box. Similar to the preceding two preferred embodiments, in the present preferred embodiment, after the key position is determined, it is feasible to send the confirmation instruction by pressing a key on the handle or complete confirmation by clicking the touch panel.

Figure 5:
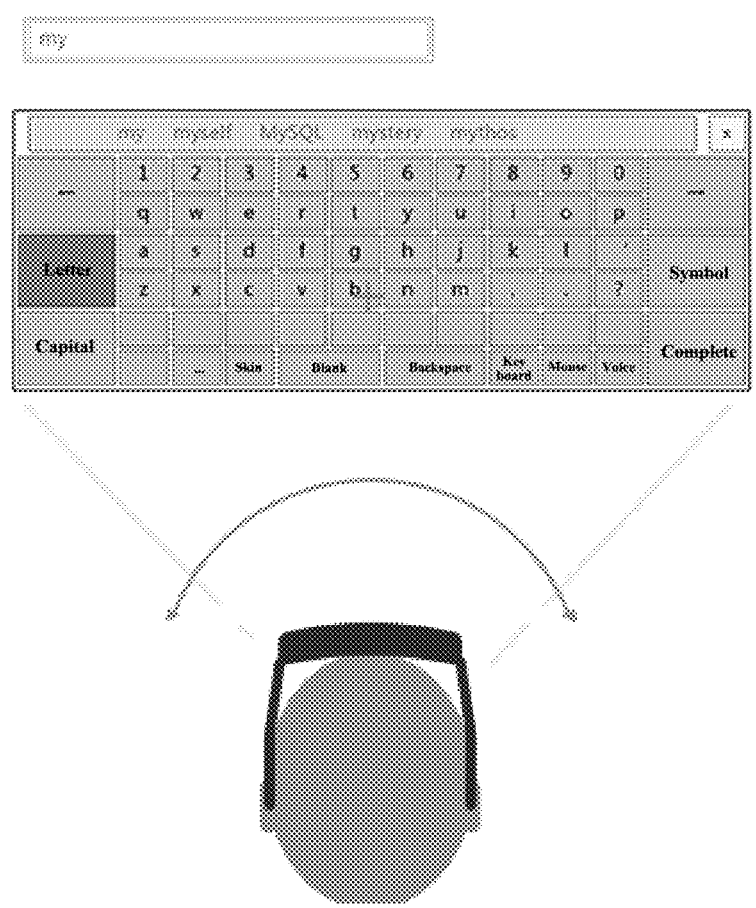
FIG. 5 is a schematic view of controlling input by turning head in an information input method in a 3D immersive environment according to an embodiment of the present disclosure.

FIG. 5 is a schematic view of controlling input by turning head in an information input method in a 3D immersive environment according to an embodiment of the present disclosure. As shown in FIG. 5, in a preferred embodiment of the present disclosure, the "selecting a key position on the virtual keyboard and determining the selected key position" in step S120 specifically comprises: locking the virtual keyboard in the immersive environment so that the virtual keyboard does not change the position along with the user's head motion; displaying the virtual cursor straight ahead the user's sight line in the immersive environment so that the virtual cursor moves along with the user's head motion; and controlling the virtual cursor to a certain key position of the virtual keyboard through the head motion and taking the key position where the virtual cursor lies as the selected key position. In the immersive environment, as the user's head turns, some content changes, and some content moves following the user's sight line and always remains within the user's sight line. In the preferred embodiment, the key position is selected by controlling the virtual cursor. If the virtual keyboard, like the virtual cursor, moves as the user's head turns, it is impossible to select a desired key position by using the virtual cursor. Hence, it is necessary to lock the virtual keyboard in the immersive environment so that the virtual keyboard does not move along with the user's head motion.

Further preferably, the "sending a confirmation instruction to the selected key position, and inputting information corresponding to the selected key position into an information input box" in step S130 specifically comprises: when a time period for which the virtual cursor stays on the selected key position reaches a preset value, sending the confirmation instruction to the selected key position, and inputting information corresponding to the selected key position into the information input box; or, the system where the 3D immersive environment lies comprises a handle, binding the confirmation instruction to a certain key on the handle; when the key is pressed, inputting information corresponding to the current selected key position into the information input box. In the preferred embodiment, the confirmation instruction is sent by pressing a key on the handle. In addition, when the virtual cursor moves to a certain key position, a countdown dynamic effect will occur. So long as the user's head does not turn for a predetermined time period, the virtual cursor does not leave the key position. Upon completion of the countdown, information such as letter, digit, symbol or character corresponding to the key position is input, and if the user does not want to input information corresponding to the key position, he may cancel the countdown and cancel the input of the information corresponding to the key position only by moving his head to control the virtual cursor to move away.

The information input method in a 3D immersive environment according to the present disclosure solves the problem that the user, wearing a virtual reality headset device, cannot see actual key positions of a keyboard in reality and cannot input information and enables the user to conveniently and quickly input by typewriting in the virtual environment. Solutions of preferred embodiments of the present disclosure may be used in combination, and it is also feasible to simultaneously implement solutions of preferred embodiments of the present disclosure in the same virtual reality system so that the user selects a suitable input method according to his own needs. For example, without the handle, the user may input information via the touch panel or head motion; if some users are likely to feel dizzy when he sways his head, he may input information via the handle; and if some users pursue for a better immersive feeling, he may resort to head motion or handle movement. In this way, different users' demands are satisfied.

To conclude, as compared with the prior art, the information input method in a 3D immersive environment according to the present disclosure has the following advantageous effects:

1. By displaying the virtual keyboard to the user in the 3D immersive environment and receiving the user's selection and confirmation instruction of the key position on the virtual keyboard, the information input method in a 3D immersive environment according to the present disclosure solves the problem that the user, wearing a virtual reality headset device, cannot see actual key positions of a keyboard in reality and cannot input information and enables the user to conveniently and quickly input by typewriting in the virtual environment.

2. The information input method in a 3D immersive environment according to the present disclosure provides many manners of controlling input, e.g., operating a key on the handle, moving the handle, sliding on the touch panel, or moving head, or the like. These manners may be implemented simultaneously in the same virtual reality system so that the user selects a suitable input manner according to his own needs and different users' demands are satisfied.

It should be noted that, the above embodiments are intended to illustrate the present disclosure, rather than limiting the present disclosure, and a person skilled in the art can design alternative embodiments without departing from the scope of the attached claims. The word "comprise" does not exclude the elements or steps that are not listed in the claims. The present disclosure can be implemented by means of hardware that comprise numbers of different elements and by means of computers that are properly programmed. In claims that list numbers of units of devices, some of these devices can be embodied via the same hardware item.

The description provided herein illustrates many concrete details. However, it can be understood that, the embodiments of the present disclosure can be implemented without the concrete details. In some embodiments, well known methods, structures and techniques are not described in detail, so as not to obscure the understanding of the description. The languages used in the description are chosen mainly for sake of readability and teaching, and are not chosen to interpret or define the subject matter of the present disclosure.

The invention claimed is:

1. An information input method in a 3D immersive environment, wherein in the 3D immersive environment a user cannot see real-world objects, wherein the method comprises:
    displaying a virtual keyboard in the 3D immersive environment, wherein a default selected key position for highlighting is set on the virtual keyboard;
    displaying a virtual cursor in the immersive environment, controlling the virtual cursor to move into the area of the virtual keyboard, and changing the virtual cursor into a selection box for selecting a key position, wherein when the virtual cursor moves to a certain key position, a countdown dynamic effect will occur;
    selecting a key position on the virtual keyboard and determining the selected key position; and
    ending a confirmation instruction to the selected key position, and inputting information corresponding to the selected key position into an information input box to thereby complete information input for one time.

2. The information input method in a 3D immersive environment according to claim 1, wherein,
    the system where the 3D immersive environment lies comprises a handle;
    the selecting a key position on the virtual keyboard and determining the selected key position specifically comprises:
        sending a key position selection instruction via up, down, left or right direction key of the handle, and controlling the selection box to move to a key position adjacent to the currently-selected key position in a corresponding direction as a new selected key position.

3. The information input method in a 3D immersive environment according to claim 2, wherein the sending a confirmation instruction to the selected key position, and inputting information corresponding to the selected key position into an information input box specifically comprises:
  binding the confirmation instruction to a certain key on the handle; when the key is pressed, sending the confirmation instruction to the selected key position, and inputting information corresponding to the current selected key position into the information input box.

4. The information input method in a 3D immersive environment according to claim 1, wherein,
  the system where the 3D immersive environment lies comprises a handle having a gyroscope function;
  the selecting a key position on the virtual keyboard and determining the selected key position specifically comprises:
    collecting spatial movement information of the handle via the gyroscope of the handle, and
    controlling movement of the virtual cursor in the immersive environment; and
      moving the handle to control the selection box to move to a certain key position of the virtual keyboard, and taking the key position where the selection box lies as the selected key position.

5. The information input method in a 3D immersive environment according to claim 4, wherein the sending a confirmation instruction to the selected key position, and inputting information corresponding to the selected key position into an information input box specifically comprises:
  binding the confirmation instruction to a certain key on the handle; when the key is pressed, sending the confirmation instruction to the selected key position, and inputting information corresponding to the current selected key position into the information input box.

6. The information input method in a 3D immersive environment according to claim 1, wherein,
  the system where the 3D immersive environment lies comprises a handle on which a touch panel is disposed; or, the system where the 3D immersive environment lies does not comprise a handle, but a touch panel is disposed on a headset device of a system where the 3D immersive environment lies;
  the selecting a key position on the virtual keyboard and determining the selected key position specifically comprises:
    sliding a finger up, down, to the left or to the right on a surface of the touch panel to control the selection box to move to a certain key position of the virtual keyboard, and taking the key position where the selection box lies as the selected key position.

7. The information input method in a 3D immersive environment according to claim 6, wherein the sending a confirmation instruction to the selected key position, and inputting information corresponding to the selected key position into an information input box specifically comprises:
  by clicking the touch panel one time, sending the confirmation instruction to the selected key position, and inputting information corresponding to the current selected key position into the information input box.

8. The information input method in a 3D immersive environment according to claim 1, wherein the system where the 3D immersive environment lies does not comprise a handle, and the selecting a key position on the virtual keyboard and determining the selected key position specifically comprises:
  locking the virtual keyboard in the immersive environment so that the virtual keyboard does not change the position along with the user's head motion;
  displaying the virtual cursor straight ahead the user's sight line in the immersive environment so that the virtual cursor moves along with the user's head motion; and
  controlling the virtual cursor to a certain key position of the virtual keyboard through the head motion and taking the key position where the virtual cursor lies as the selected key position.

9. The information input method in a 3D immersive environment according to claim 8, wherein the sending a confirmation instruction to the selected key position, and inputting information corresponding to the selected key position into an information input box specifically comprises:
  when a time period for which the virtual cursor stays on the selected key position reaches a preset value, sending the confirmation instruction to the selected key position, and inputting information corresponding to the selected key position into the information input box.

* * * * *